United States Patent
Wolf et al.

(10) Patent No.: US 9,211,816 B2
(45) Date of Patent: Dec. 15, 2015

(54) VEHICLE SEAT, VEHICLE AND METHOD FOR ADJUSTING A VEHICLE SEAT

(71) Applicant: GM Global Technology Operations LLC, Detroit, MI (US)

(72) Inventors: Eduard Wolf, Pfungstadt (DE); Michael Hoefgen-Allmann, Erfelden (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/782,683

(22) Filed: Mar. 1, 2013

(65) Prior Publication Data

US 2014/0084654 A1    Mar. 27, 2014

(30) Foreign Application Priority Data

Jun. 9, 2012  (DE) ...................... 10 2012 011 507 U

(51) Int. Cl.
| | |
|---|---|
| *B60N 2/02* | (2006.01) |
| *B60N 2/12* | (2006.01) |
| *B60N 2/30* | (2006.01) |
| *B60N 2/06* | (2006.01) |

(52) U.S. Cl.
CPC .. *B60N 2/12* (2013.01); *B60N 2/06* (2013.01); *B60N 2/3011* (2013.01); *B60N 2/3065* (2013.01); *B60N 2/3088* (2013.01)

(58) Field of Classification Search
CPC ........ B60N 2/20; B60N 2/206; B60N 2/3011; B60N 2/3013; B60N 2/3029; B60N 2/3031
USPC ......... 297/340, 341, 378.1, 378.14, 325, 326, 297/329, 344.1
See application file for complete search history.

(56) References Cited

U.S. PATENT DOCUMENTS

| | | | | |
|---|---|---|---|---|
| 5,531,503 | A  * | 7/1996 | Hughes  .......................... | 297/341 |
| 6,024,411 | A  * | 2/2000 | Pesta et al.  ..................... | 297/325 |
| 6,048,030 | A  * | 4/2000 | Kanda et al.  ................... | 297/341 |
| 6,059,345 | A | 5/2000 | Yokota | |
| 6,371,556 | B1 | 4/2002 | Arai | |
| 6,688,696 | B2 * | 2/2004 | Brush et al.  ................. | 297/378.1 |
| 6,817,670 | B2 * | 11/2004 | Macey  ........................ | 297/378.1 |
| 7,152,923 | B2 * | 12/2006 | Charras et al.  ........... | 297/378.12 |
| 7,686,368 | B2 | 3/2010 | Ghergheli et al. | |
| 7,854,461 | B2 | 12/2010 | Yamada | |
| 8,408,631 | B2 | 4/2013 | Sandmann et al. | |
| 2003/0122412 | A1* | 7/2003 | Niimi et al.  .................... | 297/341 |
| 2006/0267390 | A1 | 11/2006 | Epaud | |
| 2008/0122280 | A1* | 5/2008 | Jaranson et al.  .............. | 297/341 |

FOREIGN PATENT DOCUMENTS

| | | |
|---|---|---|
| DE | 10123777 A1 | 11/2002 |
| DE | 102004056810 A1 | 7/2006 |
| DE | 202009006984U1 U1 | 7/2009 |
| DE | 102008019527 A1 | 11/2009 |
| DE | 102010040424 A1 | 5/2011 |

(Continued)

*Primary Examiner* — Philip Gabler
(74) *Attorney, Agent, or Firm* — Ingrassia Fisher & Lorenz PC

(57) ABSTRACT

A method for adjusting a vehicle seat for a vehicle is provided. The method includes folding the vehicle seat and displacing the vehicle seat. Folding and displacing are coupled so that on a folding and/or a pushing, the vehicle seat is displaced into a folding position. A vehicle seat and a vehicle are also provided.

11 Claims, 2 Drawing Sheets

(56) References Cited

FOREIGN PATENT DOCUMENTS

| | | | |
|---|---|---|---|
| EP | 1413473 | A1 | 4/2004 |
| EP | 1500550 | B1 | 1/2010 |
| JP | 2000043623 | A | 2/2000 |

* cited by examiner

VEHICLE SEAT, VEHICLE AND METHOD FOR ADJUSTING A VEHICLE SEAT

CROSS-REFERENCE TO RELATED APPLICATION

This application claims priority to German Patent Application No. 10 2012 011 507.5, filed Jun. 9, 2012, which is incorporated herein by reference in its entirety.

TECHNICAL FIELD

The technical field relates to a method for adjusting a vehicle seat, a vehicle seat, and a vehicle.

BACKGROUND

Foldable and/or displaceable vehicle seats are generally known. Known mechanisms for the folding or pivoting and displacing of the vehicle seat make provision that on folding, a vehicle seat is folded together or upended, in order to make an entry of a passenger into a row of seats behind this vehicle seat easier. On displacing, the vehicle seat is displaced relative to a vehicle floor along or respectively in or contrary to a direction of travel of the vehicle.

For example, from EP 1 413 473 A1 a foldable vehicle seat, mounted so as to be longitudinally displaceable, is known. The foldable vehicle seat includes a pushing mechanism with a track part on the seat side and a track part on the body side or on the motor vehicle side, wherein, for folding, the track part on the motor vehicle side is separated from the body. A folding is only possibly in one folding position.

An optimum folding position is selected so that a maximum space is created for an entry of a passenger, and/or at the same time a collision with a front seat or with a central console is avoided.

It is therefore at least one object herein to provide a method for adjusting a vehicle seat, a vehicle seat, and a vehicle with a vehicle seat, by which an optimum folding position is able to be found in a simple manner. In addition, other objects, desirable features and characteristics will become apparent from the subsequent summary and detailed description, and the appended claims, taken in conjunction with the accompanying drawings and this background.

SUMMARY

According to an embodiment, a method for adjusting a vehicle seat for a vehicle includes folding and displacing the vehicle seat. The folding and the displacing are coupled with one another so that on a folding and/or pushing, the vehicle seat is displaced into a folding position, for example, an optimum folding position. A pivoting movement of the vehicle seat or respectively of the backrest or backrest structure is designated as folding, wherein for example, firstly a seat backrest or backrest structure is folded onto a sitting part and subsequently the vehicle seat is upended, i.e., is pivoted about a front pivot axis. A displacing of the vehicle seat takes place, for example, on an initiation of the pushing and/or folding process. The method is suited or respectively provided, for example, for so-called easy-entry systems. By the coupling of the movements, it is ensured that the vehicle seat is brought into an optimum folding position. Thereby, the ease of use for a user is increased.

In an embodiment of the method, the vehicle seat is displaced firstly in a first direction into a displacement position, and a folding is carried out after the displacement position is reached. In embodiments, the displacement position is a front final position of an adjustment path of the vehicle seat. A displacing into the displacement position takes place automatically, semi-automatically or manually.

In a further embodiment of the method, on folding, the vehicle seat is displaced into the folding position contrary to the first direction. The folding position is selected here so that a collision with other components during folding is avoided. A folding of the vehicle seat takes place automatically, semi-automatically or manually. In an embodiment, for folding, the seat is displaced at least partially back from the displacement position, in particular from a foremost displacement position.

In another embodiment of the method, after a folding and/or at the end of a folding movement, the vehicle seat is displaced along the first direction into the displacement position. The displacement position is selected here to be nearer to a front seat or a central console than the folding position, so that an optimum ease of entry is achieved. The displacing into the displacement position takes place here, for example, on folding of the vehicle seat into a final position, wherein the movements are coupled for a high degree of ease of use.

In an embodiment, in a vehicle seat for a motor vehicle, means are provided for carrying out such a method.

In an embodiment, a seat structure, a seat track arrangement, and a pivot arrangement are provided in order to ensure a displacing and/or folding of the vehicle seat, and a control mechanism which controls, on a folding of the vehicle seat, a displacing of the vehicle seat into a folding position or respectively vice versa. The control mechanism ensures that the vehicle seat is situated in the optimum position during the folding process.

In an embodiment, the control mechanism has a linkage, for example, a coupling cam mechanism. By the linkage, an adjustment movement of the vehicle seat into the folding position is able to be realized in a simple manner. Through the coupling cam mechanism a suitable control or respectively coupling of a pushing or respectively travelling movement is able to be realized with a folding or respectively pivot movement.

By the seat track arrangement, the vehicle seat is displaceable along a longitudinal axis of the vehicle. In an embodiment, two seat track arrangements are provided, arranged in parallel. In another embodiment, the seat track arrangement has a track part on the motor vehicle side and a track part on the seat side, arranged displaceably to the track part on the motor vehicle side.

In an embodiment, a stop is provided. The stop delimits a displacement movement into a displacement position. The displacement position is selected suitably here. With a manual displacement, the reaching of the stop is able to be signaled to a user for a haptic and/or acoustic perception via a corresponding signal arrangement.

In a further embodiment, the pivot arrangement has a lever unit on the seat structure side, connected rotatably with the track part on the seat side. In connection with the application, any element is designated as a lever unit, which, for example, is configured in one piece with the seat structure and/or is coupled therewith mechanically.

The linkage comprises at least two levers, coupled rotatably with one another, which in connection with the application are designated as links. In an embodiment, a first link of the linkage is rotatably connected with the lever unit. In a further embodiment, a second link of the linkage is rotatably connected with the track part on the seat side. In a further embodiment, the control mechanism has at least one motion link, along which the second link is guided on a folding of the vehicle seat transversely to the direction of the displacement movement. As the second link is connected rotatably with the track part on the seat side, a movement of an end of the second link along the motion link causes a displacing of the track part on the seat side in longitudinal direction. By the coupling with the first link, the second link, on folding of the seat, is compelled into a movement along the motion link. In other words, by the linkage, a folding movement of the seat structure is translated into a movement of the second link transversely to the direction of the displacement movement and hence into a displacing of the vehicle seat. In an embodiment, the second link is constructed as a coupler. For this, in an embodiment, the second link is coupled rotatably to the first link.

In another embodiment, a vehicle, comprising at least one row of seats with at least one seat arrangement is provided. The seat arrangement is constructed as a vehicle seat described above.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof Furthermore, there is no intention to be bound by any theory presented in the preceding background or the following detailed description.

Figure 1:
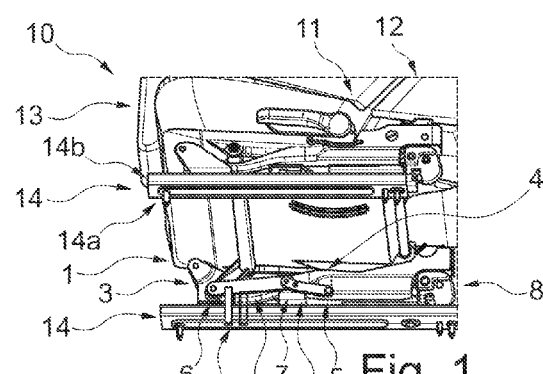
FIG. 1 is a cutout of a perspective view of a vehicle seat with a pivot arrangement in accordance with an exemplary embodiment.

FIG. 1 shows a cutout of a perspective view of a vehicle seat 10 with a pivot arrangement 1 in accordance with an embodiment, with viewing direction onto an underside of the vehicle seat 10. The vehicle seat 10 includes a seat structure 11. The seat structure 11 comprises a seat backrest or respectively backrest structure 12 and a sitting part 13. The seat backrest 12 is coupled here foldably to and/or with the sitting part 13, for example via a corresponding detent arrangement or a detent fitting. The vehicle seat 10 further comprises two seat track arrangements 14. The seat track arrangements 14 are arranged on both sides of the vehicle seat 10 along a longitudinal direction of the vehicle (also designated as longitudinal extent) spaced apart laterally on the sitting part 13 and parallel to one another. By means of the track arrangements 14, the vehicle seat 10 is displaceable in longitudinal direction relative to a vehicle base (not illustrated here). The track arrangements 14 have respectively a track part 14a on the vehicle side and a track part 14b on the seat side. The track part 14a on the vehicle side is fixed to the vehicle floor in a stationary manner. The track part 14b on the seat side is fixed to a pivot arrangement 1 or respectively has the pivot arrangement 1. The track parts 14a and 14b are constructed so as to be slidable relative to one another. A detailed description of the track parts 14a and 14b or respectively of the seat track arrangement 14 is dispensed with, because these components are known from the general prior art.

The pivot arrangement 1 is constructed respectively between the seat structure 11 and the seat track arrangements 14. The pivot arrangement 1 has a lever unit 3 on the seat structure side, which is pivotably articulated on the track part 14b on the seat side. On a displacing of the vehicle seat 10, the track part 14b on the seat side moves with the pivot arrangement 1 fastened thereon and with the seat structure 11 relative to the track part 14a on the vehicle side. Between the seat structure 11 and the track part 14a on the vehicle side, in addition a control mechanism with a linkage 4 is arranged, by which, on a folding of the vehicle seat 10, a displacing of the vehicle seat 10 into a folding position is brought about. The linkage 4 comprises a first link 4a, a second link 4b and a motion link 4c, in which an end of the second link 4b is able to be guided by means of catching arms 5. The first link 4a is rotatably connected with the lever unit 3 by a pivot joint 6, which also serves as rotary bearing on the lever unit 3. The second link 4b is rotatably connected with the track part 14b on the seat side by a pivot joint 7. The motion link 4c cooperates with the catching arms 5 also on displacing of the seat, and serves as a stop in order to delimit a displacement movement.

In an embodiment, the pivot arrangement 1 has in addition a locking unit 8. By the locking unit 8, the folding movement is able to be prevented.

Figure 2:
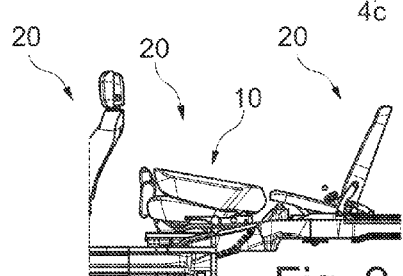
FIGS. 2-7 are cutout side views of a vehicle with three rows of seats and with a vehicle seat according to FIG. 1 on displacing and folding of the vehicle seat.
Figure 3:
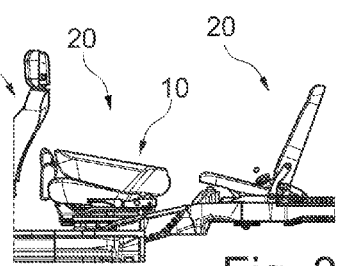
Figure 4:
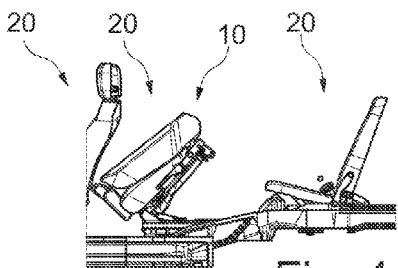
Figure 5:
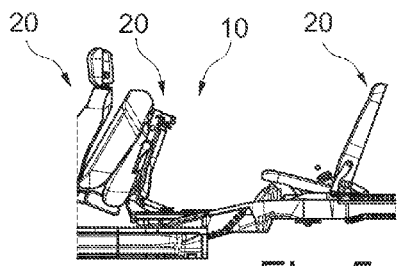
Figure 6:
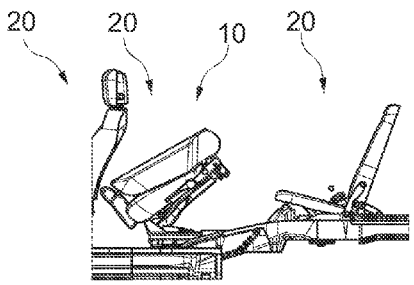
Figure 7:
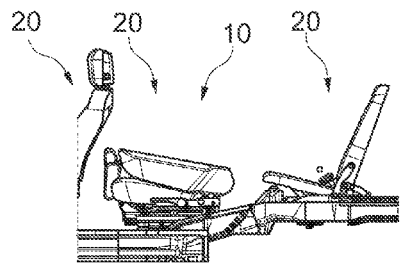

FIGS. 2 to 7 show respectively a cutout of a vehicle with three rows of seats 20, wherein in a central row of seats a vehicle seat 10 according to FIG. 1 is arranged. FIG. 2 shows here the rows of sets 20 before a displacing and/or folding of the vehicle seat 10, FIG. 3 the rows of seats after a displacing and before a folding of the vehicle seat 10, FIG. 4 the rows of seats 20 on folding of the vehicle seat 10, FIG. 5 the rows of seats 20 after a folding of the vehicle seat 10, FIG. 6 the rows of seats 20 on a folding back of the vehicle seat 10 and FIG. 7 the rows of seats 20 on using the rear row of seats.

The rows of seats 20, for example, have respectively two vehicle seats 10, wherein both vehicle seats 10 of the central row of seats 20, or only one vehicle seat of the central row of seats 20, is/are able to be folded.

As illustrated in FIGS. 2 to 7, in an embodiment, for a use of the rear row of seats 20, firstly the seat backrest or backrest structure 12 is folded onto the sitting part or the seat structure 11 of the vehicle seat 10, and subsequently the vehicle seat 10 is displaced in the direction of the front seat. After the displacing, the vehicle seat 10 is upended. The folding and the displacing are coupled with one another, so that on folding, the vehicle seat 10 is displaced into a folding position away from the front seat. Through the displacing into the folding position, it is ensured that the vehicle seat 10 is brought into an optimum folding position. At the end of a folding movement, the vehicle seat 10 is displaced again in the direction of the front seat into the displacement position, so that an optimum ease of entry is achieved. For folding back into the position of use, the vehicle seat 10 is moved again into the folding position. After the folding, the vehicle seat 10 can then be brought into a position which permits a sufficient legroom for all rows of seats 20.

As described above, to carry out the method in the illustrated example embodiment, a linkage 4 is provided with a first link 4a and a second link 4b.

Figure 8:
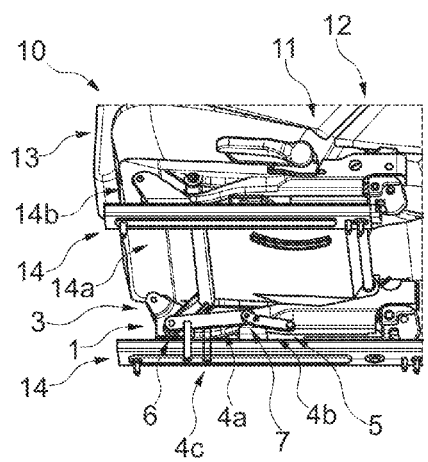
FIG. 8 is a cutout of a perspective view of the vehicle seat according to FIG. 1 before a displacing and folding of the vehicle seat.
Figure 9:
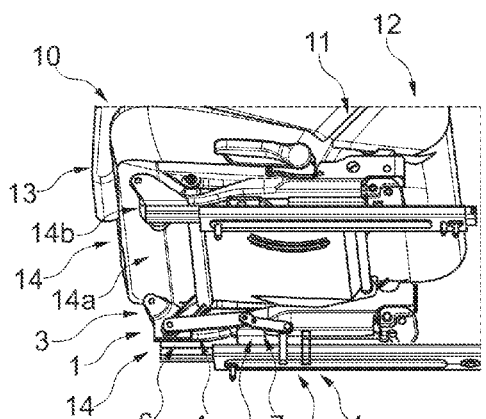
FIG. 9 is the cutout according to FIG. 8 after a displacing of the vehicle seat into a displacement position.
Figure 10:
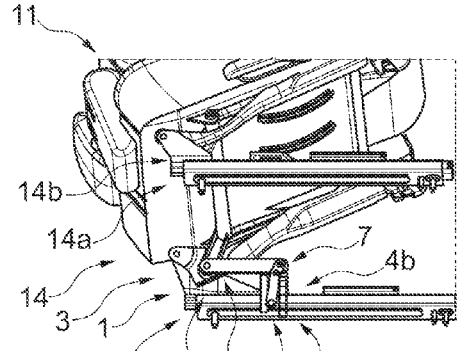
FIG. 10 is the cutout according to FIG. 8 on initiating a folding of the vehicle seat.
Figure 11:
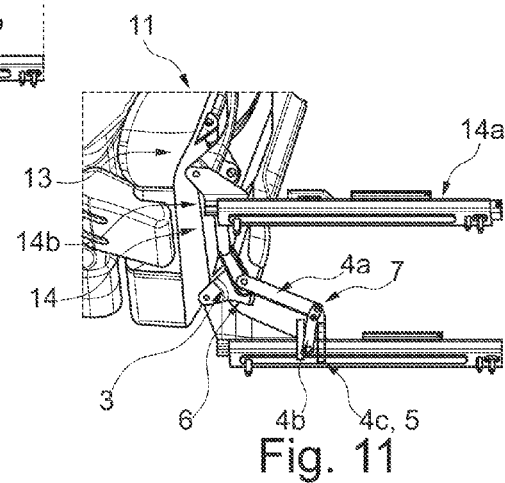
FIG. 11 is the cutout according to FIG. 8 at the end of the folding of the vehicle seat.

FIGS. 8 to 11 show respectively the cutout of a perspective view of the vehicle seat 10 according to FIG. 1, wherein FIG. 8 shows the state before a displacing and folding of the vehicle seat 10, FIG. 9 the state after a displacing of the vehicle seat 10 into a displacement position, FIG. 10 the state on initiating a folding of the vehicle seat and FIG. 11 the state at the end of the folding of the vehicle seat.

As illustrated in FIGS. 8 and 9, in an embodiment, before a folding of the vehicle seat 10, the vehicle seat 10 is displaced forward into a displacement position. The movement is limited here by a collision of the catching arms 5 with the motion link 4c. On initiation of the folding movement, as illustrated in FIG. 10 the folding movement is transferred via the first link 4a, arranged rotatably on the lever unit 3, to the second link 4b such that the second link 4b is introduced into the motion link 4c. As the second link 4b is coupled with the track part 14b on the seat side, through the displacement movement of the second link 4b transversely to the direction of the track arrangement 14, the track part 14b on the seat side and hence the seat structure 11 is displaced toward the rear into the folding position. As illustrated in FIG. 11, at the end of the folding movement the second link 4b is drawn out from the motion link 4c again. This leads to a displacing of the track part 14b on the seat side and hence of the seat structure 11 forward into the displacement position.

The bearing sites of the pivot joints 6, 7 are suitably selected in order to realize an optimum movement sequence. The pivot joint 6 is arranged on the lever unit 3 offset to a pivot axis of the lever unit 3. In the illustrated example embodiment, the bearing site of the pivot joint 7 is arranged in the initial position beneath the pivot axis of the lever unit 3, so that the bearing site is initially offset towards the rear on initiating of the folding movement. The second link 4b is driven, by the movement of the first link 4a, into a pivot movement in the opposite direction to the folding movement and is introduced into the motion link 4c. The track part 14b on the seat side has an upwardly projecting bracket, on which the pivot joint 6 is arranged for the second link 4b.

In the illustrated example embodiment, only one control mechanism is provided. However, embodiments are also conceivable in which a linkage 4 is provided at each track arrangement.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A method for adjusting a vehicle seat that comprises a seat structure, a seat track arrangement comprising a track part on a seat side, a pivot arrangement, and a control mechanism, the method comprising the steps of:
   displacing the vehicle seat, wherein the pivot arrangement has a lever unit on a seat structure side that is directly and rotatably connected to the track part on the seat side, wherein the pivot arrangement directly couples the seat structure to the seat track arrangement in order to ensure the displacing and a folding of the vehicle seat; and
   controlling, via the control mechanism, when the vehicle seat is displaced into and reaches a displacement position, the folding of the vehicle seat into a folded position, wherein the control mechanism comprises: a linkage having a first link and a second link; and a motion link, wherein the first link is rotatably connected with lever unit, wherein the second link is rotatably connected with track part on the seat side, and is guided along the motion link upon the folding of the vehicle seat transversely to a direction of a displacement movement, wherein the folding and the displacing are coupled so that upon the folding the vehicle seat is displaced into the folded position.

2. The method according to claim 1, wherein displacing comprises displacing the vehicle seat in a first direction into a displacement position and folding is carried out after the displacement position is reached.

3. The method according to claim 2, wherein folding comprises: displacing the vehicle seat into the folding position that is contrary to the first direction.

4. The method according to claim 3, wherein after a folding and/or at the end of a folding movement, the vehicle seat is displaced along the first direction into the displacement position.

5. A vehicle seat for a motor vehicle, the vehicle seat comprising:
   a seat structure;
   a seat track arrangement comprising a track part on a seat side;
   a pivot arrangement that directly couples the seat structure to the seat track arrangement in order to ensure a displacing and folding of the vehicle seat, wherein the pivot arrangement has a lever unit on a seat structure side that is directly and rotatably connected to the track part on the seat side; and
   a control mechanism that controls folding of the vehicle seat such that when the vehicle seat is displaced into a displacement position the vehicle seat folds into a folded position, wherein the control mechanism comprises:
      a linkage having a first link and a second link; and
      a motion link,
      wherein the first link is rotatably connected with the lever unit,
      wherein the second link is rotatably connected with the track part on the seat side and is guided along the notion link on a folding of the vehicle seat transversely to a direction of a displacement movement.

6. The vehicle seat according to claim 5, wherein the seat track arrangement further comprises:
   a track part on a motor vehicle side, wherein the track part on a seat side is arranged displaceably to the track part on the motor vehicle side.

7. The vehicle seat according to claim 5, further comprising:
   a stop that delimits a displacement movement of the vehicle seat into the displacement position.

8. A vehicle having at least one row of seats with at least one seat arrangement, wherein the at least one seat arrangement comprises:
   a seat structure;
   a seat track arrangement comprising a track part on a seat side;
   a pivot arrangement that directly couples the seat structure to the seat track arrangement to ensure a displacing and folding of the vehicle seat, wherein the pivot arrangement has a lever unit on a seat structure side that is directly and rotatably connected to the track part on the seat side; and
   a control mechanism that controls folding of the vehicle seat such that when the vehicle seat is displaced into a displacement position the vehicle seat folds into folded position, wherein the control mechanism comprises:
a linkage having a first link and a second link; and
a motion link,
wherein the first link is rotatably connected with the lever unit,
wherein the second link is rotatablly connected with the track part on the seat side, and is guided along the motion link on a folding of the vehicle seat transversely to a direction of a displacement movement.

9. The vehicle according to claim 8, wherein the seat track arrangement further comprises:
a track part on a motor vehicle side, wherein the track part on a seat side is arranged displaceably to the track part on the motor vehicle side.

10. The vehicle according to claim 8 further comprising:
a stop that delimits a displacement movement of the vehicle seat into a displacement position.

11. The vehicle seat according to claim 5, wherein the linkage further comprises:
a coupling cam mechanism.

\* \* \* \* \*